United States Patent
Johansson et al.

(10) Patent No.: US 10,219,147 B2
(45) Date of Patent: Feb. 26, 2019

(54) ENHANCED CODEC CONTROL

(71) Applicant: MEDIATEK INC., Hsinchu (TW)

(72) Inventors: Johan Johansson, Kungsangen (SE);
Chia-Chun Hsu, Taipei (TW);
Chien-Chun Huang-Fu, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/481,448

(22) Filed: Apr. 6, 2017

(65) Prior Publication Data
US 2017/0303114 A1    Oct. 19, 2017

Related U.S. Application Data

(60) Provisional application No. 62/319,353, filed on Apr. 7, 2016.

(51) Int. Cl.
*H04W 8/22* (2009.01)
*G10L 19/002* (2013.01)
(Continued)

(52) U.S. Cl.
CPC .............. *H04W 8/22* (2013.01); *G10L 19/002* (2013.01); *G10L 19/24* (2013.01); *H04W 72/04* (2013.01); *H04W 88/02* (2013.01)

(58) Field of Classification Search
CPC ....................................................... H04W 8/22
(Continued)

(56) References Cited

U.S. PATENT DOCUMENTS

| 6,889,050 B1 | 5/2005 | Willars et al. ............. 455/452.2 |
| 2003/0036408 A1 | 2/2003 | Johansson et al. ........... 455/560 |

(Continued)

FOREIGN PATENT DOCUMENTS

| CN | 101938851 A | 6/2009 |
| CN | 104581677 A | 10/2013 |

OTHER PUBLICATIONS

International Search Report and Written Opinion of International Search Authority for PCT/CN2017/079722 dated Jun. 30, 2017 (11 pages).
(Continued)

*Primary Examiner* — Michael T Vu
(74) *Attorney, Agent, or Firm* — Imperium Patent Works; Mark Marrello

(57) ABSTRACT

Apparatus and methods are provided for enhanced codec control. In one novel aspect, a method includes receiving a codec control command by a user equipment (UE) in a wireless network, determining if the recommended codec characteristic will be applied to a codec executing on the UE, and adjusting a characteristic of the codec executing on the UE based on the recommended codec characteristic. The UE is connected with a radio access network (RAN) and the codec control command includes a recommended codec characteristic. In another novel aspect, the recommended codec characteristic is a maximum bitrate. In another embodiment, the recommended codec characteristic is a type of codec. In yet another novel aspect, the recommended codec characteristic is a radio resource allocation command. In another novel aspect, the UE determines all available codec bitrates that can be performed by the UE and communicates the bitrates before receiving the codec control command.

18 Claims, 7 Drawing Sheets

(51) Int. Cl.
  *G10L 19/24*    (2013.01)
  *H04W 72/04*    (2009.01)
  *H04W 88/02*    (2009.01)

(58) Field of Classification Search
  USPC .......................................... 455/444–445, 466
  See application file for complete search history.

(56)      References Cited

U.S. PATENT DOCUMENTS

2006/0031476 A1      2/2006  Mathes et al. ................. 709/224
  2009/0040925 A1*     2/2009  Holmstrom ......... H04L 41/5006
                                                         370/230
  2015/0085875 A1      3/2015  Phillips et al. ............... 370/465
  2016/0323425 A1*   11/2016  Atarius ................. G10L 19/005

OTHER PUBLICATIONS

Taiwan IPO, office action for the TW patent application 106111673 (no English translation is available) dated Jun. 28, 2018 (5 pages).

* cited by examiner

ENHANCED CODEC CONTROL

CROSS REFERENCE TO RELATED APPLICATIONS

This application claims priority under 35 U.S.C. § 119 from U.S. Provisional Application No. 62/319,353 entitled "Enhanced Codec Control" filed on Apr. 7, 2106, the subject matter of which is incorporated herein by reference.

TECHNICAL FIELD

The disclosed embodiments relate generally to wireless communication, and, more particularly, to an enhanced method of codec control in a wireless communication system.

BACKGROUND

Audio quality, such as voice audio quality, is an important aspect of communication systems. Audio quality expectations among users is grow at an accelerated rate. Many users experience high levels of voice quality when using high bandwidth communication systems, such as Voice of Internet Protocol (VoIP). High Definition (HD) Voice was created to provide improved voice quality for mobile communications. HD Voice provides improved voice quality by utilizing wider audio bandwidth up to 8 kHz provided by the Adaptive Multi-Rate-WideBand (AMR-WB) codec. This improvement in audio quality improves the clarity of speech and provides a more natural feel to mobile conversations. HD Voice doubles the audio bandwidth compared to traditional telephony.

The 3$^{rd}$ Generation Partnership Project (3GPP) has developed an Enhanced Voice Services (EVS) codec that provides high quality voice and general audio, such as music, and provides low latency communication well suited for real-time communication. While the EVS codec was developed with 3$^{rd}$ Generation Partnership Project Long Term Evolution (LTE) in mind, the EVS codec is also useful for Voice over IP (VoIP) and Circuit-Switched (CS) systems. Relative to previous voice codecs, the EVS codec provides improved audio quality for same bitrate. This improved audio quality at the same bitrate provides improved network capacity while maintaining audio quality. The EVS codec extends the audio bandwidth up to 20 kHz covering the full range of human hearing. The EVS codec also provides high quality audio not just for voice communications, but for generic audio such as music. The EVS codec was developed specifically for Internet Protocol (IP) based communications with improved resilience to packet loss and delay jitter. Therefore, the EVS codec not only covers the full range of human hearing, but also addresses the pitfalls of IP communications.

The EVS codec improves perceived audio quality and improves coding efficiency for narrowband and wideband audio bandwidths using a wide range of bitrates starting from 7.2 kbits per second. Non-fixed coding rates are also available in the EVS codec. A source controlled variable bitrate (SC-VBR) mode at an average bitrate of 5.9 kbits per second is supported for narrowband and wideband audio. The EVS codec provides an average bitrate starting from 9.6 kbits per second for super wideband (SWB) and starting from 16.4 kbits per second for fullband (FB). The maximum bitrate for the EVS codec is 24.4 kbits per second for narrowband and 128 kbits per second for all other audio bandwidths.

The EVS codec provides input and output sampling at 8, 16, 32 and 48 kHz. To optimize perceptual coding quality, an integrated bandwidth detector automatically adapts the actual bandwidth of the input signal, that may be a lower bandwidth than the bandwidth indicated to the EVS codec. This automatic adaptation of the bitrate allows the EVS codec to easily adapt to changes in channel capacity.

The EVS codec utilizes discontinuous transmission (DTX) including algorithms for voice activity detection (VAD) and comfort noise generation (CNG). In the SC-VBR coding mode, the DTX/CNG algorithms are always used for interactive speech coding. An advanced error concealment mechanism mitigates the quality impact of channel errors resulting in lost packets. The EVS codec also includes a system for jitter buffer management (JBM) to address the jitter. Jitter is the variation in the delay of the received packets. The EVS codec also includes a channel-aware mode to increase robustness in the presence of adverse channel conditions. The channel-aware mode operates at 13.2 kbits per second for both wideband and super wideband audio. The EVS codec also provides backward compatibility with the Adaptive Multi-Rate Wideband (AMR-WB) codec through an interoperable (IO) mode.

While the above mentioned improvement provided by the EVS codec provide greatly improved audio quality, improvements are needed regarding the controlling the adoption of the EVS codec and controlling the bitrate of the EVS codec once adopted.

SUMMARY

Apparatus and methods are provided for controlling the adoption of the EVS codec and controlling the bitrate of the EVS codec once adopted.

In one novel aspect, a codec control command is received by a user equipment (UE) in a wireless network, where the UE is connected with a radio access network (RAN) and where the codec control command includes a recommended codec characteristic. The UE then determines if the recommended codec characteristic will be applied to a codec executing on the UE and adjusts a characteristic of the codec executing on the UE based on the recommended codec characteristic.

In one embodiment, the UE determines if the recommended codec characteristic will be applied based on a known set of possible codec data rates.

In another embodiment, UE determines if the recommended codec characteristic will be applied by performing a codec rate change procedure, involving signaling with the peer codec device.

In another embodiment, the UE generates and transmits a set of possible codec data rates, where the recommended codec characteristic is based at least in part of on the set of possible codec data rates.

In another embodiment, the recommended codec characteristic is a maximum bit rate that the UE should not exceed.

In another embodiment, the recommended codec characteristic is a minimum bit rate that the UE should not go below.

In another embodiment, the recommend codec characteristic is a list of codec bitrates.

In another embodiment, the recommended codec characteristic is a radio resource allocation command.

In another embodiment, the UE selects a codec bit rate that less than and as close as possible to or equal to the maximum bit rate if it is determined that the recommended codec characteristic will be applied.

In another embodiment, the radio resource allocation command allows a specific packet size by allocating one selected from the group consisting of: allocated frequencies, allocated time, allocated resource blocks, allocated coding, allocated modulation, allocated number of antennas, and allocated transmission mode.

In another embodiment, the UE selects one of the plurality of codec types to be applied if it is determined that the recommended codec characteristic will be applied.

In another embodiment, the UE temporarily transmits at a bit rate that is greater than the maximum bit rate when deemed necessary by the UE.

In another embodiment, the UE temporarily adjusts the codec bit rate to a bit rate that is less than the minimum bit rate when deemed necessary by the UE.

In another embodiment, the codec control command is sent by a wireless communication interface controller to the UE.

In another embodiment, the wireless communication interface controller determines the recommended codec characteristic included in the codec control command.

In another embodiment, the determination of the recommended codec characteristic is based at least in part on a radio layer network measured characteristic.

In another embodiment, the radio layer network measured characteristic is selected from the group consisting of: signal-to-noise ration, network loading, and transmission capability of the UE.

In another embodiment, the wireless communication interface controller is selected from the group consisting of: 3GPP eNB, Node B, gNB, RNC, BSC, and a WiFi access point.

In another embodiment, the determination of the recommended codec characteristic is based at least in part on one selected from the group consisting of: a buffer overflow measurement and a transmission latency measurement.

In yet another embodiment, the RAN is Long Term Evolution (LTE) network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
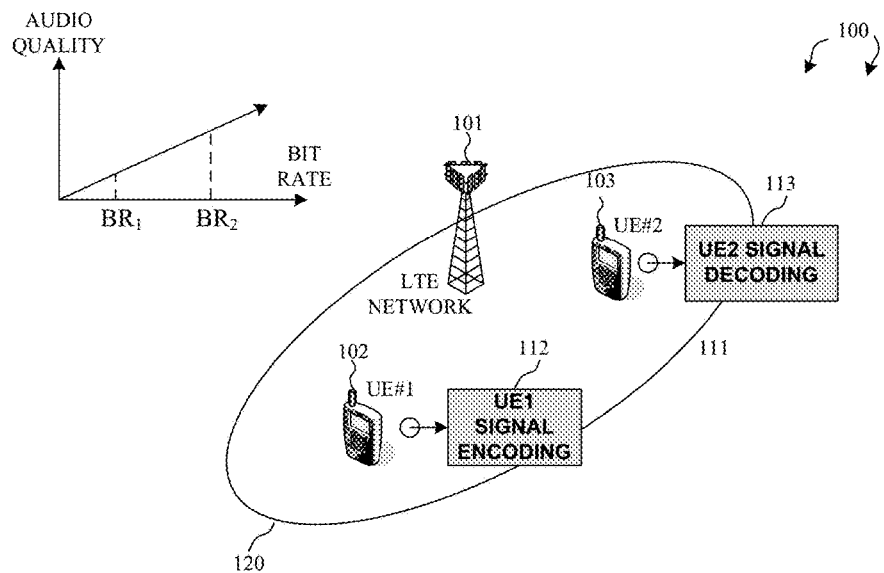
FIG. 1 illustrates a mobile communication network supporting Enhanced Voice Services (EVS) codec.

FIG. 1 illustrates a mobile communication network supporting Enhanced Voice Services (EVS) codec. The mobile network supports a novel codec control command. Mobile communication network 100 is an OFDM network comprising a serving base station eNB 101, a first user equipment 102 (UE#1), and a second user equipment 103 (UE#2). In 3GPP LTE system based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

Enhanced Voice Services (EVS) codec provides high quality voice and general audio, such as music, and provides low latency communication well suited for real-time communication. While the EVS codec was developed with $3^{rd}$ Generation Partnership Project Long Term Evolution (LTE) in mind, the EVS codec is also useful for Voice over IP (VoIP) and Circuit-Switched (CS) systems. Relative to previous voice codecs, the EVS codec provides improved audio quality for same bitrate. This improved audio quality at the same bitrate provides improved network capacity while maintaining audio quality. The EVS codec extends the audio bandwidth up to 20 kHz covering the full range of human hearing. The EVS codec also provides high quality audio not just for voice communications, but for generic audio such as music.

EVS codec rate control may be performed by Session Description Protocol (SDP) for IP based media communication. One example of an IP based media communication is an IP Multimedia Subsystem (IMP). The IP Multimedia Subsystem or IP Multimedia Core Network Subsystem (IMS) is an architectural framework for delivering IP multimedia services. Historically, mobile phones have provided voice call services over a switched-circuit-style network, however newer networks provide voice call services over an IP packet-switched network. The IMS supports media communication IP based media communication between media end-points and a controlling server. In operation, a change to the codec bitrate can be initiated by a media end-point based on performance measurements by the media end-point. One example of a performance measurement made by the media end-point is a round-trip time measurement. A round-trip time measurement is an average amount of (in milliseconds) required for a real-time transport protocol (RTP) packet to travel to another endpoint and then back. Round-trip times of one-hundred milliseconds or less are considered of acceptable quality. High round-trip values can be caused by international call routing, a routing misconfiguration, or an overloaded media server. High round-trip times result in difficulties with two-way, real-time audio conversations. Another example of a performance measurement made by the media end-point is a packet loss measurement. A packet loss measurement is an Average rate of RTP packet loss. (Packet loss occurs when RTP packets, a protocol used for transmitting audio and video across the Internet, failed to reach their destination.) High loss rates are generally caused by congestion, lack of bandwidth, wireless congestion or interference, or an overloaded media server. Packet loss typically results in distorted or lost audio. Yet another example of a performance measurement made by the media end-point is a jitter buffer measurement. A jitter buffer measurement is Average jitter detected between RTP packet arrivals. (Jitter is a measure of the "shakiness" of a call.) High jitter values are typically caused by congestion or an overloaded media server, and result in distorted or lost audio.

While these various media end-point measurements are useful indicators as to the quality of the IP based communication link, they suffer multiple drawbacks. For example, code bitrate adjustments made by a media end-point in response to measuring these various media end-point measurements requires a relatively large amount of time. For instance, when a codec bitrate of an IP based communication is to be increased a trial by error procedure must be implemented. In the trial by error procedure the media end-point must iteratively increase the codec bitrate and measure the resulting change in quality by repeating media end-point measurements once the new codec bitrate is initiated. In this iterative fashion, the media end-point must find the codec bitrate that results in the optimum quality/performance. This iterative process requires that the media end-point cycle through multiple codec bitrates before reaching optimum performance/quality. A faster and more exact method of determining and implementing a new codec rate is needed.

In a novel aspect of the present invention, an optimum codec bitrate is determined by a "controller" or "master". An eNB is usually used to denote a controller in a wireless 3GPP Evolved Universal Terrestrial Radio Access (E-UTRA) Radio Interface (Uu). This eNB is considered a controller or master within the context of the present application.

Figure 2:
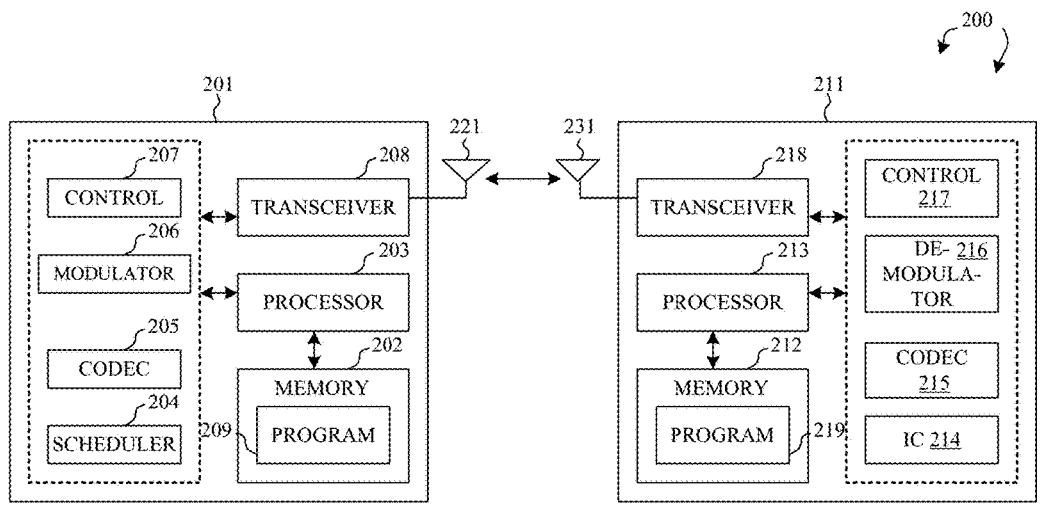
FIG. 2 is a simplified block diagram of a base station 201 and user equipment 211 that carry out certain embodiments of the present invention in a mobile communication network 200.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via codec 205), modulate (via modulator 206), and transmit control information and data (via control circuit 207) to UE 211, and allow UE 211 to receive, de-modulate (via de-modulator 216), and decode (via codec 215) the control information and data (via control circuit 217) accordingly with interference cancellation capability. In one example of enhanced codec control operation, base station 201 determines an optimum codec bitrate for the UE 211 based on transmission characteristics of the communication interface between the base station 201 and the UE 211. The base station 201 then communicates a codec control command to UE 211 and the UE 211 in turn adjusts a characteristic of the codec 215 operation on the UE 211. A codec control command may include a recommended bitrate sent together with other data, such as: embedded in a MAC protocol, as a MAC Control Element, or embedded as a recommended bitrate information element in a control protocol such as RRC.

Figure 3:
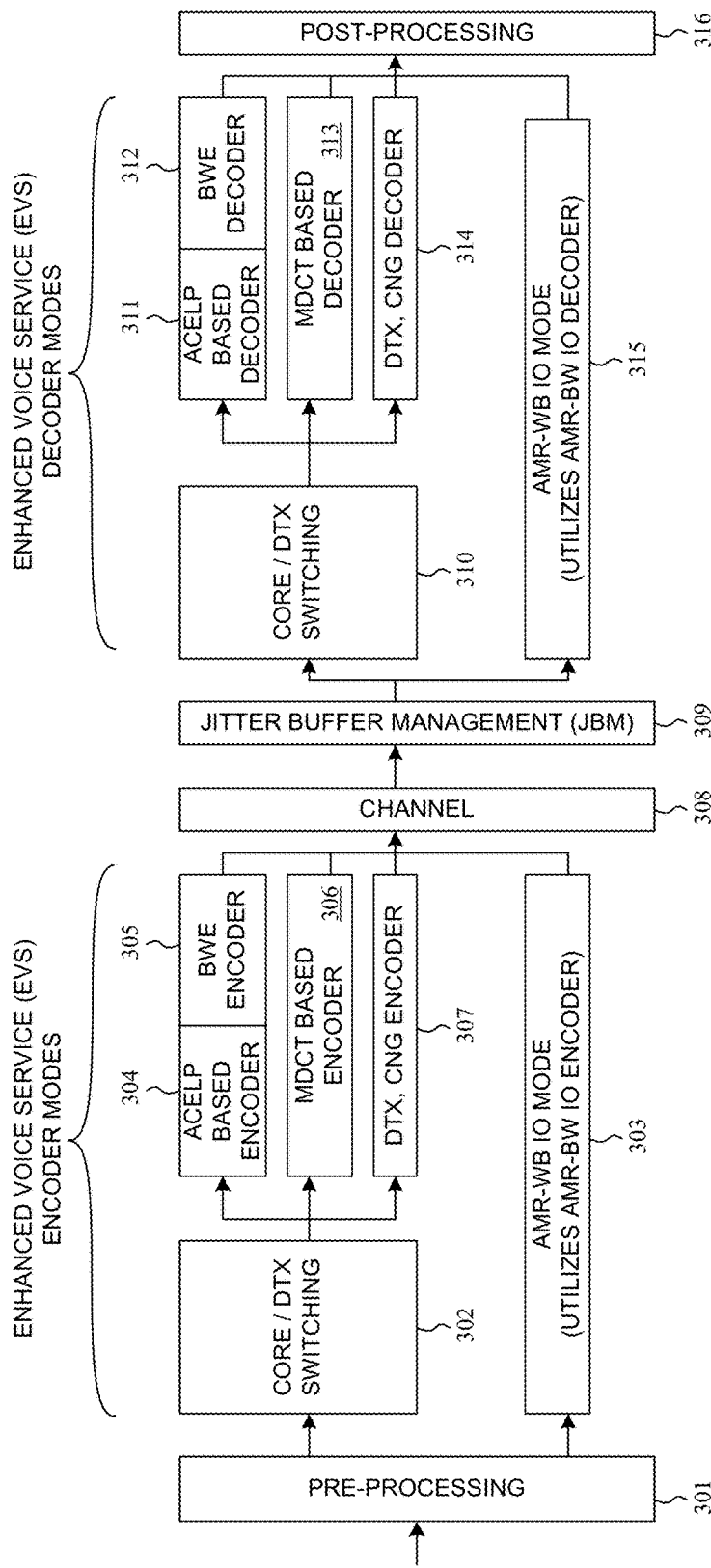
FIG. 3 is a high-level diagram of an Enhanced Voice Service (EVS) codec.

FIG. 3 is a high-level diagram of an Enhanced Voice Service (EVS) codec. The pre-processing 301 consists mainly of high-pass filtering at 20 Hz, resampling, signal activity detection, noise update and estimation, bandwidth detector, signal analysis and classification. The analysis and processing from the pre-processing unit 301 enables a very fine classification of the signal type and a targeted coding method is applied to each case. This fine tuning to the input signal characteristics makes the EVS codec extremely versatile content-wise. Even though the signal bandwidth is signaled as an input parameter, the bandwidth detector is employed to detect lower than signaled bandwidth. This is done in order to avoid inefficient coding for band-limited content. Based on the bitrate and input bandwidth, the encoding process in the EVS codec uses two different internal sampling rates, thereby allowing better fidelity of the encoded signal with respect to the original input signal. Within the EVS modes, the core and DTX switching 302 is performed based on information extracted during pre-processing, as well as on the overall input parameters (bitrate, use of discontinuous transmission, input signal bandwidth). If AMR-WB IO mode 303 is selected, encoding according to the interoperable AMR-WB encoder is performed. The switching between the cores, as well as between different modes can be done at each 20 ms frame boundary.

The speech core 304 used in the EVS codec is based on the principles of Algebraic Code-Excited Linear Prediction (ACELP) inherited from the AMR-WB standard. ACELP relies on the modelling of speech using linear prediction within an analysis-by-synthesis method. The linear prediction (LP) parameters and the excitation parameters are encoded and most of the bit budget of this model is allotted to the LP parameters. In order to make use of the fine content description of the coder from the preprocessing stage, different coding representations for each signal type are used. This differentiation requires high memory consumption. Furthermore, this differentiation and, implicitly, the memory requirements are further increased by the large range of bitrates that the codec supports. A multi-stage structured quantizer, based on multiple-scale lattices, allows high encoding efficiency accommodating all signal types, bandwidths bitrates and internal sampling rates, while keeping the encoding complexity and the ROM tables within practical limits. In addition to the flexibility brought by the quantizer structure, controlled alternation between predictive and non-predictive modes for encoding the LP parameters provides good resilience to frame loss errors. For speech signals, the part of the bandwidth not covered by the ACELP model for SWB signals is encoded using a time-domain bandwidth extension (BWE) 305 technique. Multi-bandwidth listening test results show a significant quality improvement for SWB compared to WB for all supported operating points.

Encoding based on the Modified Discrete Cosine Transform (MDCT) 306 is best suited for music and various background type signals. Compared with other music-oriented content distribution codecs such as AAC, the EVS codec offers high quality compression of music signals at low delay and low bitrates. This is accomplished by using different MDCT-based modes, depending on content type and operating mode.

Discontinuous transmission 307 within the EVS modes is important for optimization of battery life in mobile communications. In DTX mode 307, an improved voice activity detection helps to distinguish between active speech, active music and inactive periods (recording noise, background noise) and estimates the level of the background noise. Based on these decisions, the EVS codec implements two versions of CNG, one LP-based and the second one a frequency domain CNG.

Post-processing 316, may include a music enhancer, inactive signal post processing, bass-boost filter and formant post filter, further ensure the high fidelity of the decoded signal. Compared with the AMR-WB codec, the most notable improvements due to post-processing 316 are audible in noisy channel conditions and for mixed content.

The Enhanced Voice Service (EVS) decoder modes operate in the same fashion as the EVS encoder modes however operate to decode packet received via channel 308.

Baseline Behavior

A codec includes several parts. A codec first includes a transmitting part that encodes the media, for example video or audio, into digital form and packages the contents into data packets which are transmitted. A codec also includes a receiving part that consists of several buffers that store received packets. A codec further includes a decoder that decodes the content included in the received packets so that the media can be reproduced. The several buffers may include a playout buffer or a jitter buffer. An important buffering function is to compensate for the jitter or variation delay that is inherent in packet based networks. In many applications a transmit and receive circuit is housed in the same unit. There may be several control protocols associated with the media communication and codec control. For example, a first type of control protocol may be used for communication between media end-points, such as a transmitter and a receiver. Whereas, in another example, a second type of control protocol may be used for communication between a media end-point and a controlling server.

One example of a media end-point is a UE. The UE can attempt to increase the codec bitrate applied by the UE at any occasion. When the UE attempts to increase the codec bitrate, the eNB is expected to schedule the UE over the wireless interface (Uu) at the higher Uu transmission rate. The UE can also attempt to decrease the codec bitrate applied by the UE at any occasion. When the UE attempts to decrease the codec bitrate, the eNB is expected to schedule the UE over the wireless interface at a lower Uu transmission rate. The problem with this UE initiated procedure is that multiple iterations of codec bitrate changes are necessary to find the optimum codec bitrate in this iterative fashion. This iterative trial and error method requires multiple changes to the codec bitrate followed by the gathering of multiple measurements and then comparing the gathered measurements with the previous performance measurements to determine if the iterative change in codec bitrate improved the quality of the communicated media. For example, the UE may need to try seven different codec bit rates before determining which codec bitrate is optimum. Another problem with this iterative trial by error process is that the Quality of Experience (QoE) observed by the user may degrade if the UE codec bitrate is increased too aggressively in the iterative process. If, however, the UE was somehow informed as to what is the recommended optimum codec bitrate without performing this iterative process, the UE could quickly change to a new codec bitrate that is as close as possible to the recommended codec bitrate with a single coded bitrate change, thereby relieving the need to perform the time wasting iterative process of finding the optimum codec bitrate.

Controlling the codec bitrate based on network conditions instead of UE codec failures can provide improved performance. In the iterative process, the UE will attempt to change the codec bitrate only in response to a codec processing error. For example, when the codec bitrate is too slow, the UE may experience buffer underflowing, where the buffered content is consumed faster than it is received, thus resulting in an empty buffer and interrupted media playback. The need to increase the codec bitrate is not addressed by the UE until the buffer is observed. However, in a system where the optimum codec bitrate is determined and communicated to the UE, the UE can increase the codec bitrate before the buffer underflow failure is observed, thereby preventing the unwanted interruption in media playback.

In the iterative process the UE will also attempt to change the codec bitrate in response to a buffer overflow, where the buffer content is not be consumed faster than it is received, thus resulting in packets be dumped which causes an interruption in media playback. However, in a system where the optimum codec bitrate is determined and communicated to the UE, the UE can decrease the codec bitrate before the buffer overflow failure is observed, thereby preventing the unwanted interruption in media playback.

The iterative process also does not address the selection of the optimum codec based on the network conditions. The UE codec bitrate may be set to an optimum bitrate, however the UE codec may not be the optimum codec under the current network conditions. Therefore, a codec control command could also include a suggested codec, which would optimize the media communication.

Figure 4:
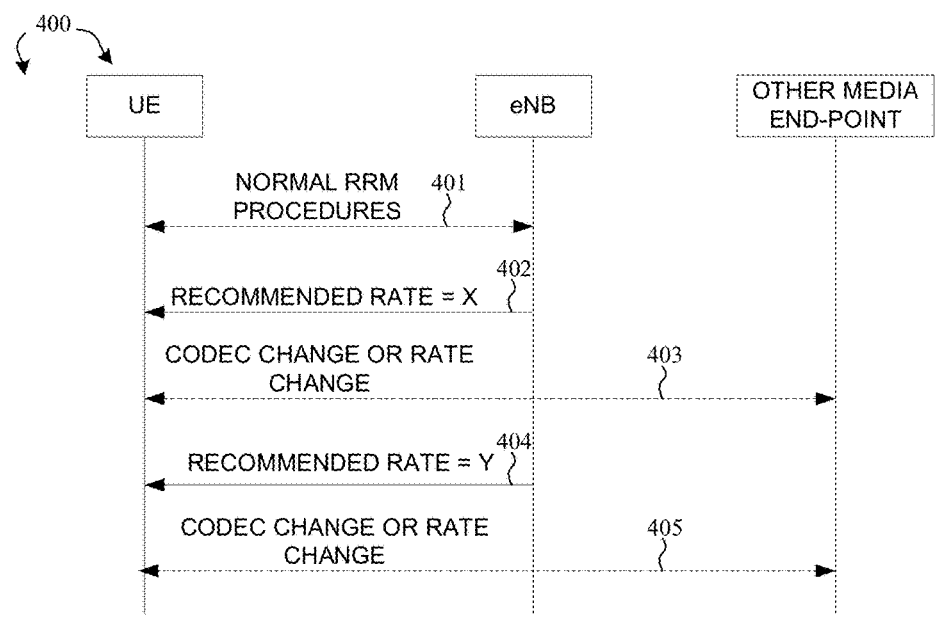
FIG. 4 is a diagram of a first method of codec and bitrate control signaling.

FIG. 4 is a diagram of a first method of codec and bitrate control signaling. In step 401, by performing normal radio resource management and controlling the bitrate of the radio interface, the eNB has full knowledge of UE radio conditions, the limitations set by specific UE radio transmission capabilities and the load caused by other UEs. Therefore, utilizing the eNB as a controller (referred to as "wireless communication interface controller") of the codec bitrate enables very high efficiency because the media codec bitrates can be adapted with low latency and low overhead. However, this disclosure is not limited to using an eNB as a controller. The controller disclosed herein is a general controller of a wireless communication interface that has the ability to control the bitrate of media codecs using the wireless interface. In other embodiments, the controller can be a 3GPP gNB, a Node B, a RNC, a BSC, a WiFi access point, or any other type of wireless access point.

In step 402, the eNB sends control information to the UE, where the control information includes a bit-rate, and where the control information (may) result in codec change or codec rate change for a media stream. The said bit-rate is interpreted by the UE as a recommended transport bitrate for a logical channel that the UE should not exceed. As typically codec rate control is done per direction, the bit-rate may be given separately for uplink and downlink. A benefit of interpreting the bitrate as a transport bitrate for a logical channel, is that the eNB does not need to have detailed information that requires disassembly and inspection of media packets. The bitrate includes all header overhead and includes all possible codec bits. This is also beneficial for multi-stream codecs, because all the streams that are mapped to be carried by a certain logical channel are included. A benefit of interpreting the bit-rate as a recommendation, is that it allows the recommended bitrate to sometimes not be followed. This gives the UE the possibility to transmit and receive control information that is additional to codec bits, such as Real-time Transport Protocol (RTCP) reports. Another benefit of interpreting the bitrate as a recommendation is that deployments where the eNB does not have information about the possible codec bitrates can be possible. For example, when the eNB does not know the exact maximum bitrate supported by a particular codec, the eNB can simply communicate a recommended bitrate and the UE can then unilaterally change the codec bitrate to the closest possible bitrate.

The benefits of interpreting the given bitrate as a max bitrate is that it is consistent with current end-to-end Codec rate control and it establishes the roles of the UE and eNB clearly. Within this interpretation, the UE shall follow the given bit-rate (i.e. the eNB is seen as a master, UE is a slave) rather than reacting too quickly to scheduling commands. This interpretation also avoids the problem of iterative trial and error that can be seen in control architectures without a master role.

In step 403, a codec change or a codec bitrate change is communicated from one media end-point to the other media end-point. In step 404, the eNB communicates a new recommended codec bitrate Y based on changed network conditions. Network conditions may include radio layer network measured characteristics such as signal-to-noise ration, network loading, and transmission capability of the UE. In step 405, a second codec change or a codec bitrate change is communicated from one media end-point to the other media end-point.

Figure 5:
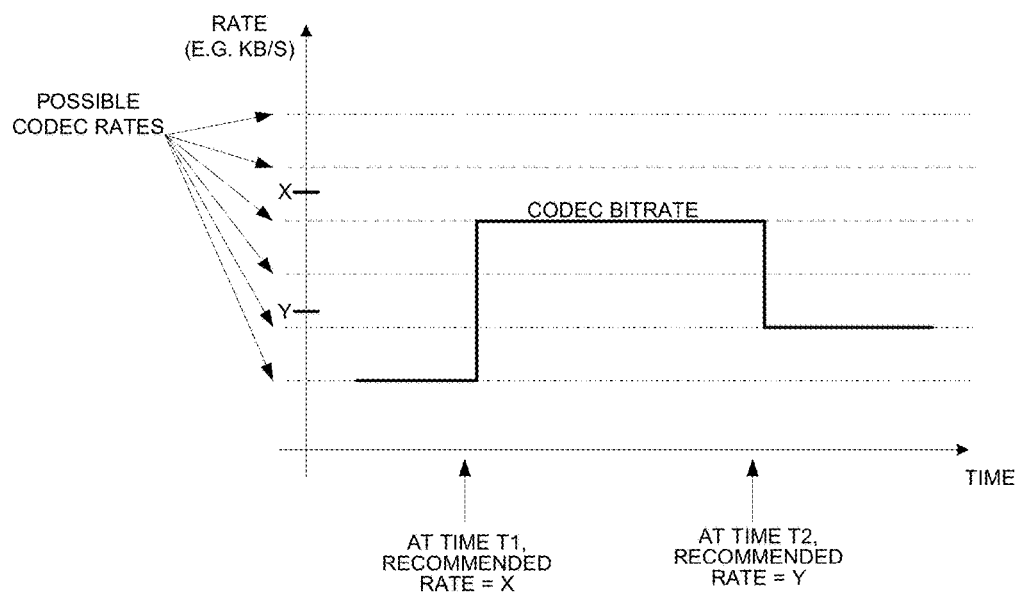
FIG. 5 is a diagram illustrating the resulting codec bitrate in response to receiving a codec control command.

FIG. 5 is a diagram illustrating the resulting codec bitrate in response to receiving a codec control command. FIG. 5 illustrates the possible codec bitrates that can result from a codec control command. As discussed above, the possible codec bitrates are known to the UE, but may not be known to the eNB. The possible codec bitrates may depend on the codec capabilities in both media end-points and can be determined by exchange of control information between the end points or between the UE and a media controller (e.g. an IMS controller using SIP, which carries possible codec bitrates by Session Description Protocol (SDP) descriptions). Referring back to FIG. 4, the first recommended codec bitrate is X bits per second. FIG. 5 illustrates X bits per second on the Y-axis of the diagram. Inspection of FIG. 5 shows that the codec bitrate does not exceed X bits per second. Moreover, FIG. 5 shows that the codec bitrate does not reach X bits per second. This figure illustrates the functional result of a recommended bitrate where the UE can unilaterally decided to not apply the exact bitrate recommended by the controller. In this fashion, the controller can steer the bitrate of the UE codec without knowing the exact codec bitrates that are possible.

Figure 6:
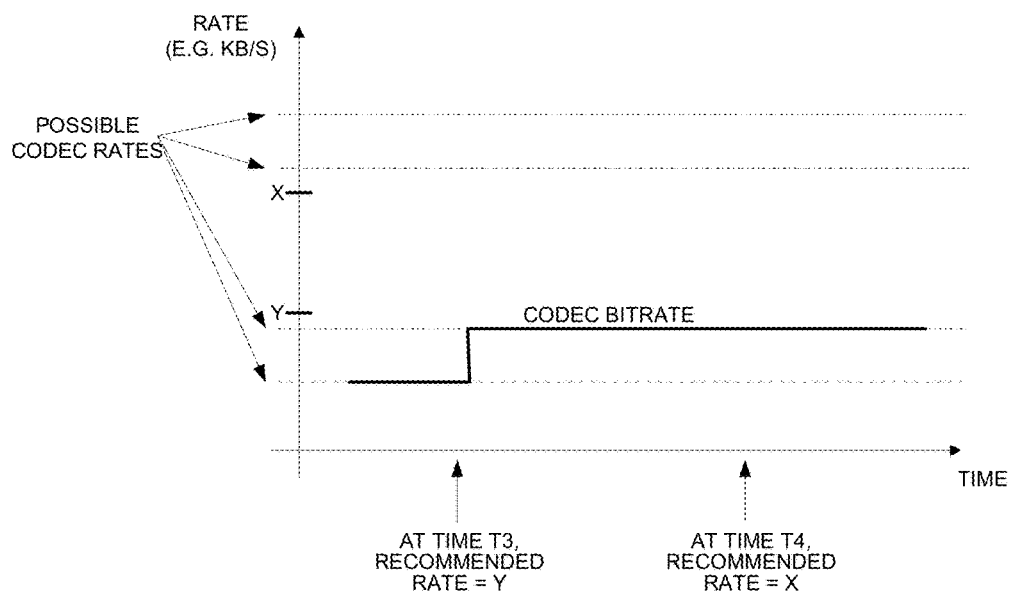
FIG. 6 is a diagram illustrating the resulting codec bitrate in response to receiving a codec control command.

FIG. 6 is a diagram illustrating the resulting codec bitrate in response to receiving a codec control command. FIG. 6 illustrates the possible codec bitrates that can result from a codec control command. As discussed above, the possible codec bitrates are known to the UE, but may not be known to the eNB. The possible codec bitrates may depend on the codec capabilities in both media end-points and can be determined by exchange of control information between the end points or between the UE and a media controller (e.g. an IMS controller using SIP, which carries possible codec bitrates by Session Description Protocol (SDP) descriptions). Referring back to FIG. 4, the second recommended codec bitrate is Y bits per second. FIG. 6 illustrates Y bits per second on the Y-axis of the diagram. Inspection of FIG. 6 shows that the codec bitrate does not exceed Y bits per second. Moreover, FIG. 6 shows that the codec bitrate does not reach Y bits per second. This figure illustrates the functional result of a recommended bitrate where the UE can unilaterally decided to not apply the exact bitrate recommended by the controller. In this fashion, the controller can steer the bitrate of the UE codec without knowing the exact codec bitrates that are possible.

Figure 7:
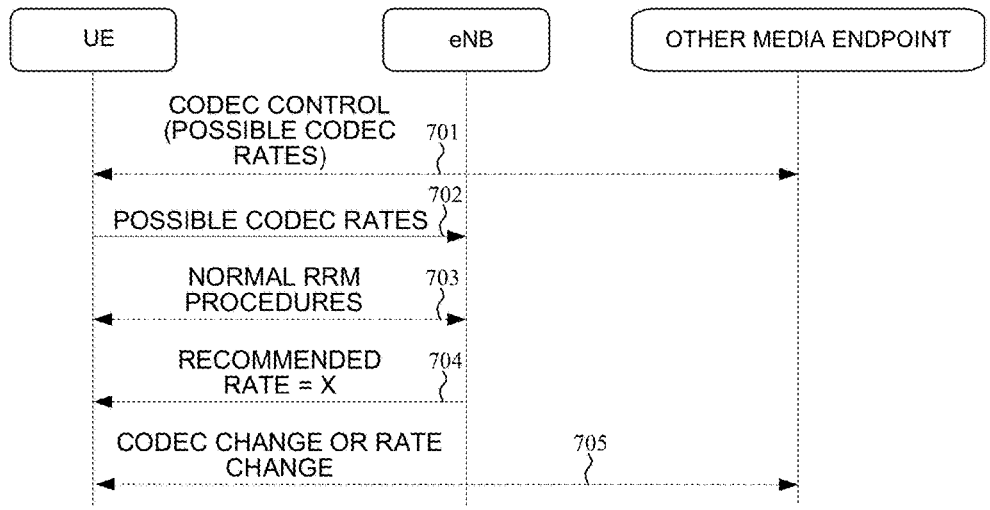
FIG. 7 is a diagram illustrates a second method of codec control signaling using a codec control command.

FIG. 7 is a diagram illustrates a second method of codec control signaling using a codec control command. In step 701, the two media end-points determine what the possible codec bitrates are possible. In step 702, the possible codec bitrates are communicated to the controller (eNB). In step 703, by performing normal radio resource management and controlling the bitrate of the radio interface, the eNB has full knowledge of UE radio conditions, the limitations set by specific UE radio transmission capabilities and the load caused by other UEs. The controller (eNB) then uses the possible codec bitrates to generate an optimum codec bitrate that the UE has the ability to implement. In step 704, the controller (eNB) communicates the recommended codec bitrate to the UE. In step 705, the UE then implements a change to the codec bitrate based on the bitrate recommendation.

Figure 8:
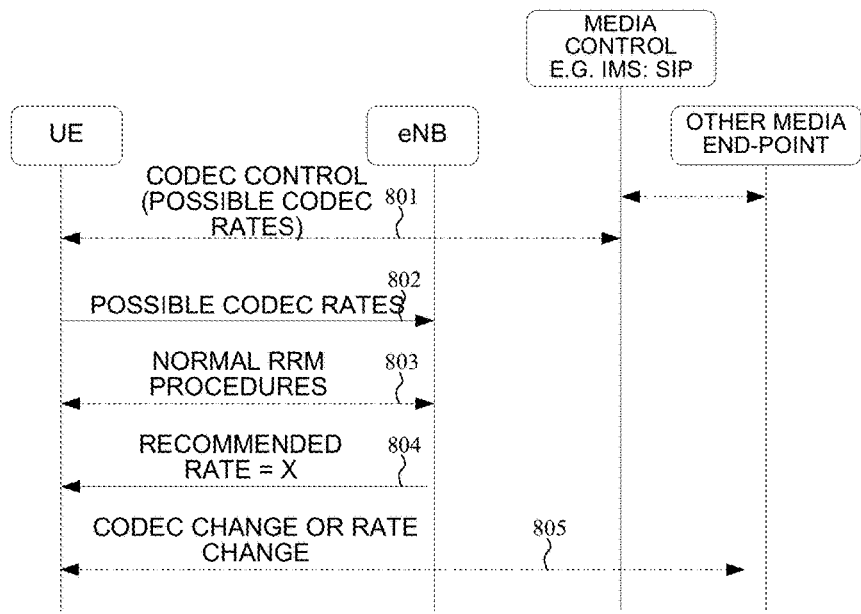
FIG. 8 illustrates another method of codec control signaling using a codec control command.

FIG. 8 illustrates another method of codec control signaling using a codec control command. FIG. 8 is the same as FIG. 7, except for the way in which the possible codec bitrates are determined. In FIG. 7, the possible codec bitrates were determined by direct negotiation between the two media end-points. In FIG. 8, the possible codec bitrates are determined by a media controller, such as an P Multimedia Core Network Subsystem (IMS) controller, that provides the possible codec bitrates to the UE by Session Initiation Protocol (SIP) or Session Description Protocol (SDP).

Figure 9:
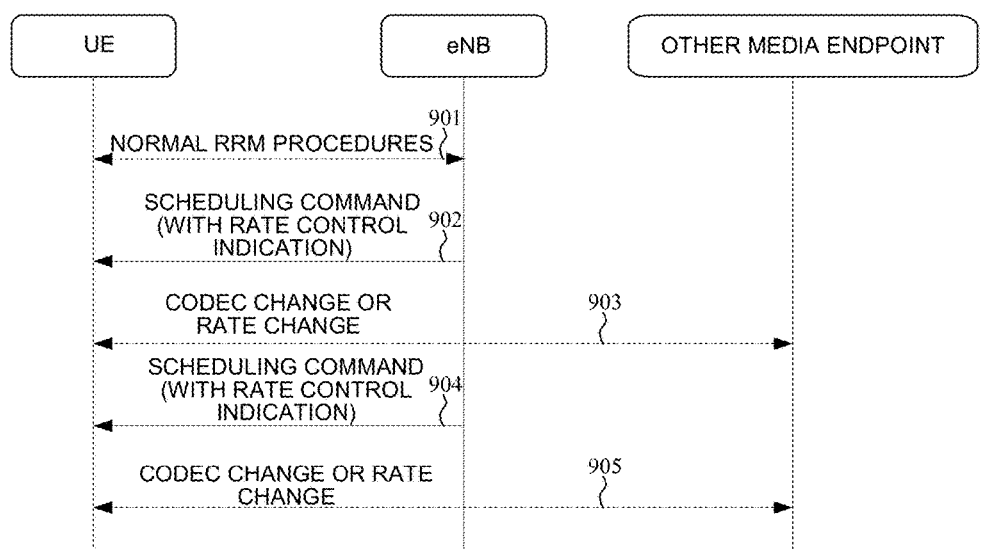
FIG. 9 is a diagram illustrating another method of codec control signaling using a codec control command.

FIG. 9 is a diagram illustrating another method of codec control signaling using a codec control command. The recommended codec bitrate is provided implicitly to the UE by scheduling commands (step 902) that contain a radio resource allocation. A radio resource allocation (e.g. frequencies, time, resource block, coding, modulation, number of antennas, transmission mode etc) allows a certain packet size on the application level. Codecs that generate packets regularly or where radio resource allocation can be assumed to be regular, the radio resource allocation also translates to a certain codec bitrate. In response to receiving the scheduling command, the UE uses the codec bitrate inferred by the scheduling command containing the radio resource allocation, as a recommended codec bitrate, and the UE will attempt to adapt the codec bitrate to fit the provided radio resource allocation. It is noted herein, that in this embodiment the method to command the UE to increase the codec bitrate would be to provide the higher bitrate in scheduling and provide the rate control indication with this scheduling command(s). Alternatively, when decreasing the bitrate, the eNB would provide scheduling for a smaller packet size and indicate the rate control indication. Note that the eNB can still serve the UE with the smaller packet size, by scheduling segmented packets. However in this example, the UE should interpret the rate control indication as a preferred packet size and adjust accordingly. The benefit with the rate control indication is that it becomes clear to the UE how to interpret provided radio resources with respect to codec rate control, and perform fast adaptation. In the prior art, the UE could not make such assumptions but would need to wait for buffer overflow (rate decrease) or trial error (rate increase).

Figure 10:
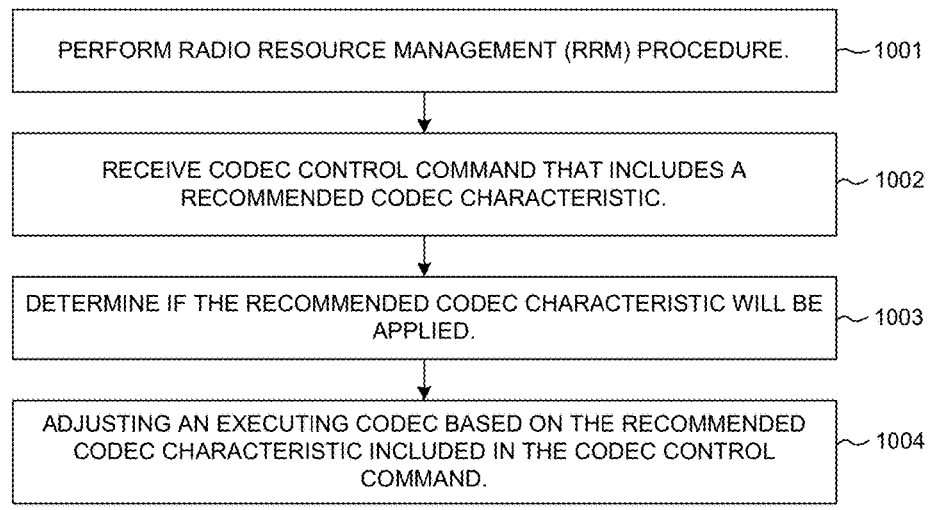
FIG. 10 is a flow chart illustrating the steps performed in a first embodiment of enhanced codec control.

FIG. 10 is a flow chart illustrating the steps performed in a first embodiment of enhanced codec control. In step 1001, a User Equipment (UE) performs a Radio Resource Management (RRM) procedure. In step 1002, the UE receives a codec control command that includes a recommended codec characteristic. In step 1003, the UE determines if the suggested codec characteristic will be applied to a codec executing on the UE. In step 1004, the UE adjusts the coded executing on the UE based on the recommended codec characteristic included in the received codec control command.

Figure 11:
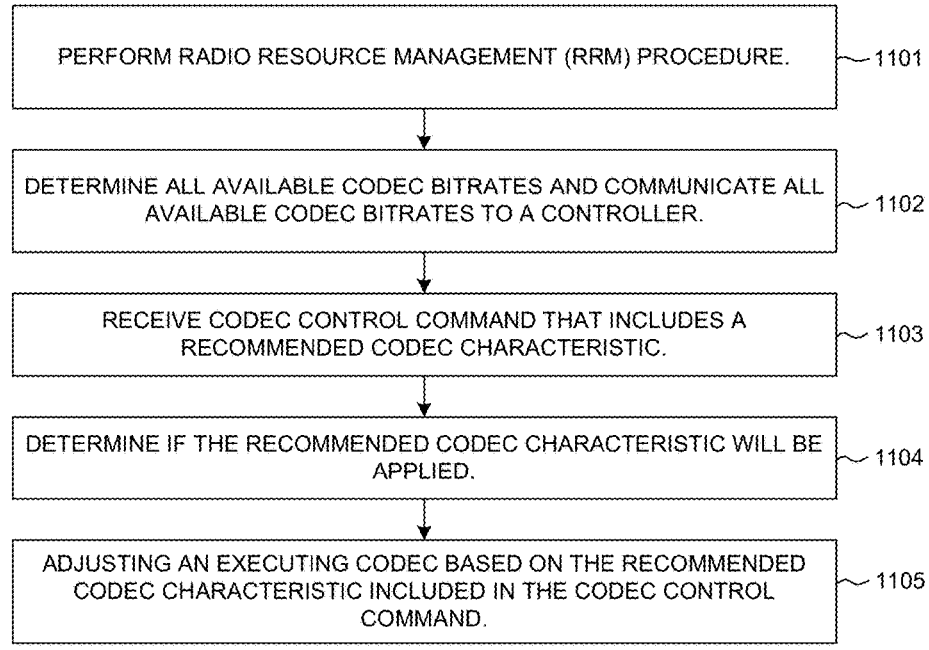
FIG. 11 is a flow chart illustrating the steps performed in a second embodiment of enhanced codec control.

FIG. 11 is a flow chart illustrating the steps performed in a second embodiment of enhanced codec control. In step 1101, a User Equipment (UE) performs a Radio Resource Management (RRM) procedure. In step 1102, the UE determines all available codec bitrates that the UE can perform and communicates all the available codec bitrates to a controller. In step 1103, the UE receives a codec control command from the controller that includes a recommended codec characteristic. In step 1104, the UE determines if the suggested codec characteristic will be applied to a codec executing on the UE. In step 1105, the UE adjusts the coded executing on the UE based on the recommended codec characteristic included in the received codec control command.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
receiving a codec control command by a user equipment (UE) in a wireless network, wherein the UE is connected with a radio access network (RAN), wherein the codec control command includes a recommended codec characteristic;
determining if the recommended codec characteristic will be applied to a codec executing on the UE; and
adjusting a characteristic of the codec executing on the UE based on the recommended codec characteristic; wherein the recommended codec characteristic included in the codec control command is a maximum bitrate; and wherein the UE selects a codec bitrate that is less than the maximum bitrate, as close as possible to the maximum bitrate, or equal to the maximum bitrate if it is determined by the UE that the recommended codec characteristic will be applied.

2. The method of claim 1, wherein the recommended codec characteristic is a minimum bitrate.

3. The method of claim 1, wherein the recommended codec characteristic is a radio resource allocation command.

4. The method of claim 3, wherein the radio resource allocation command is used as a recommended codec characteristic only if it is indicated in the radio resource allocation command that it shall be used as a codec characteristic.

5. The method of claim 3, wherein the radio resource allocation command allows a specific packet size by allocating one selected from the group consisting of: allocated frequencies, allocated time, allocated resource blocks, allocated coding, allocated modulation, allocated number of antennas, and allocated transmission mode.

6. The method of claim 1, wherein the UE determines if the recommended codec characteristic will be applied based on a known set of possible codec bitrates.

7. The method of claim 1, wherein the UE determines if the recommended codec characteristic will be applied by performing a codec rate change procedure, involving signaling with the peer codec device.

8. The method of claim 1, wherein the UE generates and transmits a set of possible codec data rates, wherein the recommended codec characteristic is based at least in part of on the set of possible codec bitrates.

9. The method of claim 1, wherein the UE temporarily transmits at a bitrate that is greater than the maximum bitrate when deemed necessary by the UE.

10. The method of claim 1, wherein the codec control command is sent by a wireless communication interface controller to the UE.

11. The method of claim 10, wherein the wireless communication interface controller determines the recommended codec characteristic included in the codec control command.

12. The method of claim 10, wherein the wireless communication interface controller is selected from the group consisting of: 3GPP eNB, Node B, gNB, RNC, BSC, and a WiFi access point.

13. The method of claim 11, wherein the determination of the recommended codec characteristic is based at least in part on a radio layer network measured characteristic.

14. The method of claim 11, wherein the determination of the recommended codec characteristic is based at least in part on one selected from the group consisting of: a buffer overflow measurement and a transmission latency measurement.

15. The method of claim 13, wherein the radio layer network measured characteristic is selected from the group consisting of: signal-to-noise ration, network loading, and transmission capability of the UE.

16. The method of claim 1, wherein the RAN is Long Term Evolution (LTE) network.

17. The method of claim 1, wherein the UE determines all possible codec bitrates that the UE can execute, and wherein the UE communicates all the possible codec bitrates before receiving the codec control command.

18. The method of claim 17, wherein the UE determines all possible codec bitrates by communicating with a media controller.

* * * * *